A. BALLARD.
Shoes.
No. 6,333. Reissued March 16, 1875.
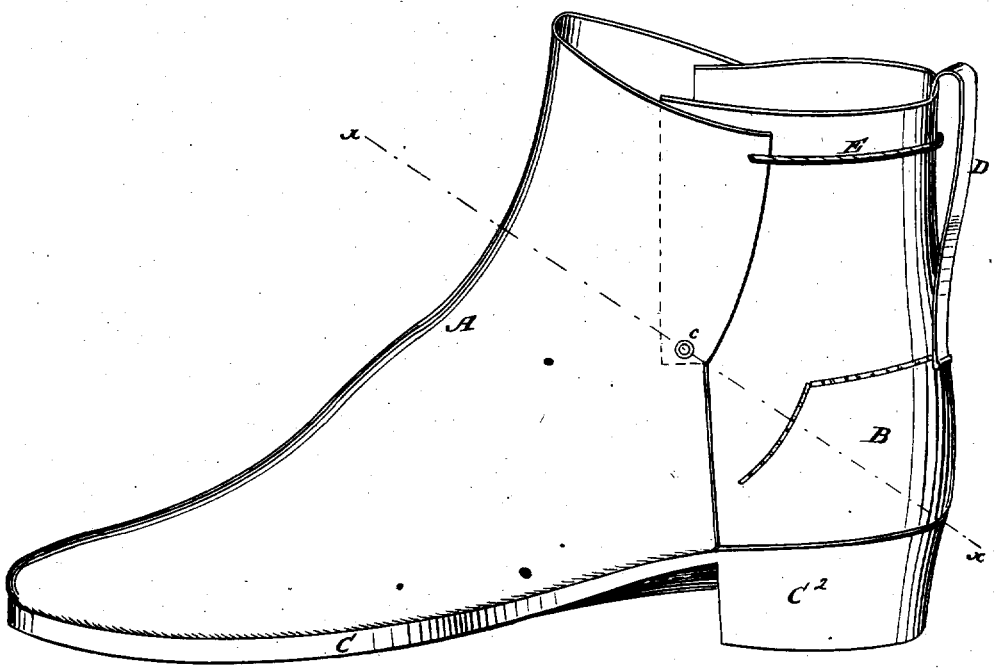
Witnesses:
E. Wolf
Jacob Felbel
Inventor.
Achilles Ballard
By atty
E. Mustaine
THE GRAPHIC CO. PHOTO-LITH. 39 & 41 PARK PLACE, N.Y.

UNITED STATES PATENT OFFICE.

ACHILLES BALLARD, OF DUBLIN, INDIANA, ASSIGNOR, BY MESNE ASSIGNMENTS, TO LEOPOLD COHN.

IMPROVEMENT IN SHOES.

Specification forming part of Letters Patent No. 55,041, dated May 29, 1866; reissue No. 6,333, dated March 16, 1875; application filed February 5, 1875.

*To all whom it may concern:*

Be it known that ACHILLES BALLARD, of Dublin, in the county of Wayne and State of Indiana, did invent a new and useful Improvement in Shoes; and that the following is a full, clear, and exact description thereof, reference being had to the accompanying drawings making part of this specification.

Previous to this invention a great variety of constructions or methods of making had been suggested and practiced in the manufacture of shoes, each and all aiming to combine, in the most eminent degree, all the qualifications necessary to make the article a perfection, but all deficient or objectionable in some of the desirable qualities or characteristic features.

Among the very greatest advantages to the wearer of a shoe are perfection of fit, ease and comfort in wear, facility in putting on and taking off the shoe, and durability and impossibility of derangement in the means by which the shoe is fastened onto the foot.

This invention has for its object to afford to the wearer a shoe which, while it embodies all the other qualities of a desirable article, shall, in the greatest possible degree, embrace all the just-enumerated peculiarities; and to this end and object this invention consists in a shoe in which that part of the "upper" which has to be spread open or turned down to permit the insertion and extrication of the foot is so constructed that the "vamp" or front part thereof shall overlap or overlay the "quarter" or rear portion thereof, and shall be connected together round about said quarter by a suitable fastener, as will be hereinafter more fully explained.

To enable those skilled in the art to make and use the invention, the following description is given of the construction and operation of a shoe embodying the same, referring by letters to the accompanying drawing, which illustrates, in perspective view, such a shoe.

A and B represent, respectively, the front and back portions (or the vamp and quarters) of the shoe-upper, which is, of course, provided with or attached to a suitable sole, C, properly heeled at $C^2$ in any approved manner. These front and rear portions A and B of the upper are united by a seam, extending, as illustrated, from the shoe-sole at a point near the front of the heel $C^2$ upward some distance, and from the point at which the parts A and B cease to be united to the top of the upper. These parts overlie each other, as illustrated, the vamp or front portion A being outside of or on top of the quarter or rear portion B of the shoe. *c* is a rivet, which durably unites the overlapped portions A and B at the proper point (on each side of the shoe) to permit the insertion of the foot, and at the same time insure a proper retention of the shoe on the foot.

To effect the desired ends just alluded to it has been found expedient to locate the pivotal points *c*, or the points down to which the upper parts of the shoe can be opened out or turned over, in a line or plane passing through the point of the heel and curve of the instep, as indicated by the dotted line *x x* in the drawing. D is a loop, by which the shoe may be conveniently pulled on, and E represents a thong, or strap and buckle, or other equivalent means for fitting the shoe around the ankle, and securing it upon the foot of the person. The forward underlying edges of the rear portions or quarter B extend upward about vertically from the point or level from which the parts A and B are separable, while the back edges of the overlapping front part or vamp A incline rearward as they ascend, or extend obliquely upward, as illustrated, whereby the lap is made greatest at the upper part or top of the shoe, and the side flaps or overlapping portions of the vamp A are permitted to draw well down around the ankles.

It will be observed that a shoe made according to the invention set forth can be easily slipped on and off, can be rendered a perfect fit, will be durable and comfortable, and can be secured by a simple thong, or single strap and buckle devices capable of adjustment and not liable to get out of working order.

A shoe made as shown and described will not only perfectly cover and snugly fit round the ankle and upper part of the foot, but will never gap open, though secured only by a single thong or strap at one point where the parts overlap, as do shoes in which the quarter B or rear portion of the upper overlaps the front portion or vamp; and, furthermore, such a shoe will not permit the ingress from the front of the shoe of dirt or snow while worn.

The size, proportions, and shapes of the parts may, of course, be varied, according to the foot of the wearer and judgment of the shoemaker, without departing from the spirit of the described invention, the gist of which it will be understood rests in the idea of having the upper capable of opening out or turning over sufficiently to permit the insertion and withdrawal of the foot, and so constructed and operating that the vamp or front shall overlap the quarter, and be fastened or connected together round about said quarter, substantially as described, in contradistinction to the forward edges of the quarter overlapping the vamp, as usual previous to the invention, made the subject of this application in shoes, in which the overlapped parts were fastened together.

What is claimed as new, and desired to be secured by Letters Patent, is—

A shoe in which the front or vamp overlaps the quarter or back portion, and has the parts of said vamp secured together, as set forth.

In testimony whereof I have hereunto set my hand and seal this 30th day of January, 1875.

LEOPOLD COHN. [L. S.]

In presence of—
J. N. McINTIRE,
JACOB FELBEL.